(12) United States Patent
Shiraishi

(10) Patent No.: US 9,977,364 B1
(45) Date of Patent: May 22, 2018

(54) LENS MIRROR ARRAY

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Takashi Shiraishi, Kanagawa (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/451,610

(22) Filed: Mar. 7, 2017

(51) Int. Cl.
| | |
|---|---|
| *G03G 15/04* | (2006.01) |
| *G02B 3/00* | (2006.01) |
| *G02B 17/00* | (2006.01) |
| *G02B 17/08* | (2006.01) |
| *G02B 5/00* | (2006.01) |

(52) U.S. Cl.
CPC ..... *G03G 15/04036* (2013.01); *G02B 3/0006* (2013.01); *G02B 5/003* (2013.01); *G02B 17/002* (2013.01); *G02B 17/086* (2013.01)

(58) Field of Classification Search
CPC .. G03G 15/04036; G02B 3/006; G02B 5/003; G02B 17/002; G02B 17/086; G02B 3/0006
See application file for complete search history.

(56) References Cited

U.S. PATENT DOCUMENTS

| | | | |
|---|---|---|---|
| 2013/0235434 A1* | 9/2013 | Akiyama | G02B 3/0068 358/474 |
| 2013/0314754 A1 | 11/2013 | Shiraishi | |
| 2013/0314797 A1* | 11/2013 | Shiraishi | G02B 17/0856 359/627 |
| 2014/0204474 A1 | 7/2014 | Shiraishi | |
| 2016/0216634 A1 | 7/2016 | Shiraishi | |
| 2016/0216635 A1 | 7/2016 | Shiraishi | |

* cited by examiner

*Primary Examiner* — Clayton E Laballe
*Assistant Examiner* — Jas Sanghera
(74) *Attorney, Agent, or Firm* — Amin, Turocy & Watson LLP

(57) ABSTRACT

According to one embodiment, there is provided the lens mirror array in which a plurality of optical elements includes one pair or more of first light blocking surfaces that are formed by sharing sides thereof with the first mirror surface at positions nipping the symmetrical surface in the arrangement direction of the optical elements, a second light blocking surface that is formed on a side close to the second lens surface further than the first mirror surface on the same side as the first mirror surface of the optical elements, a concave portion configuring one pair of third light blocking surfaces that are formed to be recessed from the second light blocking surface in a direction orthogonal to the second light blocking surface over the adjacent two optical elements.

19 Claims, 9 Drawing Sheets

LENS MIRROR ARRAY

FIELD

Embodiments described herein relate generally to a lens mirror array and an image forming apparatus containing a lens mirror array.

BACKGROUND

An image forming apparatus forms a latent image (electrostatic latent image) on a photoconductive drum by forming an image by light emitted from LED arrays, on the photoconductive drum, of one row or a plurality of rows in which an operation of turning on and off according to image data (print data) for printing is performed through an optical component (lens mirror array) configured in a line shape. The image forming apparatus attaches toner (developer) to the latent image formed on the photoconductive drum, forms a toner image on a paper sheet by transferring the toner of the latent image onto a paper sheet, and forms an image on the paper sheet by fixing the toner image.

In addition, the image forming apparatus forms an image by reflected light radiated on the paper sheet through the lens mirror array, on an image sensor configured in one row or a plurality of rows in a line shape. The image forming apparatus obtains an image of the paper sheet by converting charges accumulated in the image sensor into a digital signal to be read.

The lens mirror array includes a structure in which a plurality of optical elements are arranged, an optical element including a first lens surface on which light is incident, a first mirror surface that reflects the light incident on the first lens surface, a second mirror surface that reflects the light reflected by the first mirror surface, and a second lens surface that emits the light reflected by the second mirror surface. In addition, a lens mirror array, is disclosed in JP-A-2016-138947, in which a light blocking surface for preventing the light incident on the first lens surface in a certain optical element from entering other optical elements is provided.

DETAILED DESCRIPTION

Figure 1:
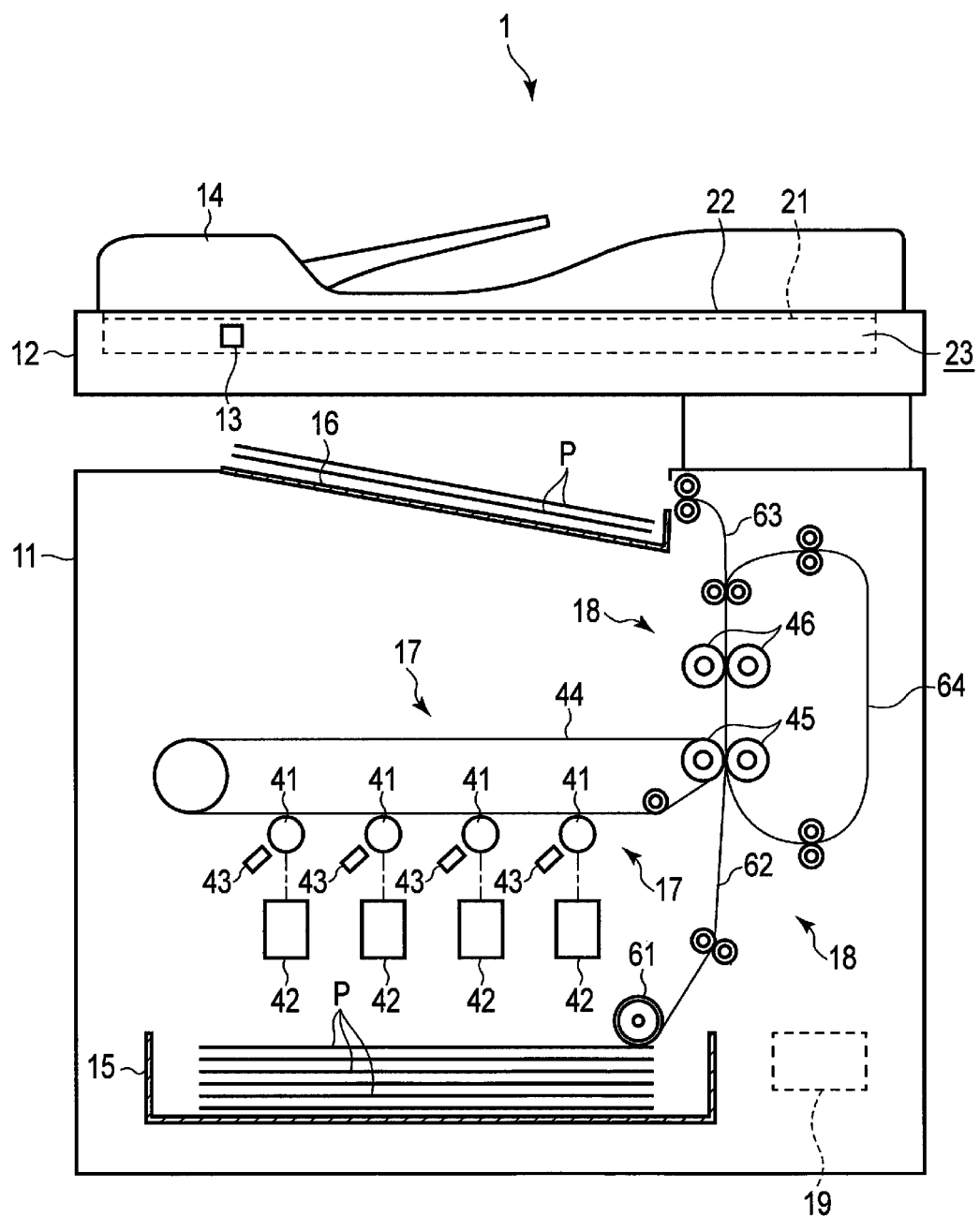
FIG. 1 is a diagram for explaining a configuration example of an image forming apparatus according to a first embodiment.

In general, according to one embodiment, the lens mirror array includes a pair of light blocking surfaces arranged for each optical element along an arrangement direction of the optical elements. The pair of light blocking surfaces are provided at positions which share sides thereof with the first mirror surface, respectively.

The lens mirror array is formed by injection molding. For this reason, a curved surface is formed at a corner portion of a mold due to a corner R of a tool used for manufacturing the mold. In addition, there is a possibility that a resin cannot be filled into a tip of an edge portion of the mold at the time of molding. As a result, the curved surface is formed between the light blocking surface and the first mirror surface of the lens mirror array. For this reason, since a part of the light incident on the first lens surface is reflected by the curved surface between the light blocking surface and the first mirror surface, there is a possibility that the part of the light becomes stray light reaching the second mirror surface of other optical elements or the second lens surface. There is a problem that the accuracy of forming an image on the paper sheet and acquiring an image of the paper sheet by occurrence of the stray light, decreases.

An object of the embodiment is to provide a lens mirror array and an image forming apparatus with highly accurate image formation and image obtainment, and less stray light.

According to one embodiment, there is provided a lens mirror array in which a plurality of optical elements are arranged, an optical element including a first lens surface on which light is incident, a first mirror surface that reflects the light incident on the first lens surface, a second mirror surface that reflects the light reflected by the first mirror surface, and a second lens surface that emits the light reflected by the second mirror surface, and the first lens surface, the first mirror surface, the second mirror surface, and the second lens surface are respectively symmetrically formed with respect to a symmetrical surface orthogonal to an arrangement direction of the optical elements, in which the optical element includes one pair or more of first light blocking surfaces that are formed by sharing sides thereof with the first mirror surface at positions nipping the symmetrical surface in the arrangement direction of the optical elements, a second light blocking surface that is formed on a side close to the second mirror surface further than the first mirror surface on the same side as the first mirror surface of the optical elements, a concave portion configuring one pair of third light blocking surfaces that are formed to be recessed from the second light blocking surface in a direction orthogonal to the second light blocking surface over the adjacent two optical elements, and inclined with respect to an arrangement direction of the optical elements, and a light blocking layer that is formed over the first light blocking surface, the second light blocking surface, and the third light blocking surface.

Hereinafter, an image forming apparatus and a lens mirror array according to a first embodiment will be described with reference to drawings.

First, an image forming apparatus 1 according to the first embodiment will be described. FIG. 1 is a diagram for explaining a configuration example of the image forming apparatus 1 according to the first embodiment.

For example, the image forming apparatus 1 is a solid scan type printer (for example, LED printer) that performs various processes of image formation or the like while a recording medium of a paper sheet P or the like is transported. The image forming apparatus 1 charges a photoconductive drum and forms a latent image (electrostatic latent image) on the photoconductive drum by forming an image by light emitted from LED arrays, on the photoconductive drum, of one row or a plurality of rows in which an operation of turning on and off according to image data (print data) for printing is performed through optical components (lens mirror array) configured in a line shape. In addition, the image forming apparatus 1 attaches toner (developer) to the latent image formed on the photoconductive drum, and forms a toner image on a paper sheet P by transferring the toner attached to the latent image on the paper sheet P. In addition, the image forming apparatus 1 nips the paper sheet P on which the toner image is formed, between fixing rollers heated to a high temperature by a heater so as to fix the toner image formed on the paper sheet P.

In addition, the image forming apparatus 1 also functions as an image reading apparatus obtaining an image of the paper sheet P by forming an image by reflected light of light radiated on the paper sheet P, on an image sensor by the lens mirror array, and converting charges accumulated in the image sensor into a digital signal to be read.

The image forming apparatus 1 includes a casing 11, a document platen 12, a scanner unit 13, an automatic document feeder (ADF) 14, a paper feed cassette 15, a paper discharge tray 16, an image forming unit 17, a transporting unit 18, and a main control unit 19. Furthermore, the image forming apparatus 1 may include an operation I/F for receiving an operation input, a communication I/F for communicating with other apparatuses, or the like. The document platen 12, the scanner unit 13, and the automatic document feeder (ADF) 14 are parts configuring the image reading apparatus.

The casing 11 is a main body that holds the document platen 12, the scanner unit 13, the ADF 14, the paper feed cassette 15, the paper discharge tray 16, the image forming unit 17, the transporting unit 18, and the main control unit 19.

The document platen 12 is a part on which the paper sheet P as a document is placed. The document platen 12 includes a glass plate 21 on which the paper sheet P as the document is placed and a space 23 located on the opposite side of a placement surface 22 on which the paper sheet P as the document on the glass plate 21 is placed.

The ADF 14 is a mechanism for transporting the paper sheet P. The ADF 14 is provided above the document platen 12 so as to be freely opened and closed. The ADF 14 takes the paper sheet P disposed in a tray, and transports the taken paper sheet P while closely contacting with the glass plate 21 of the document platen 12.

Figure 2:
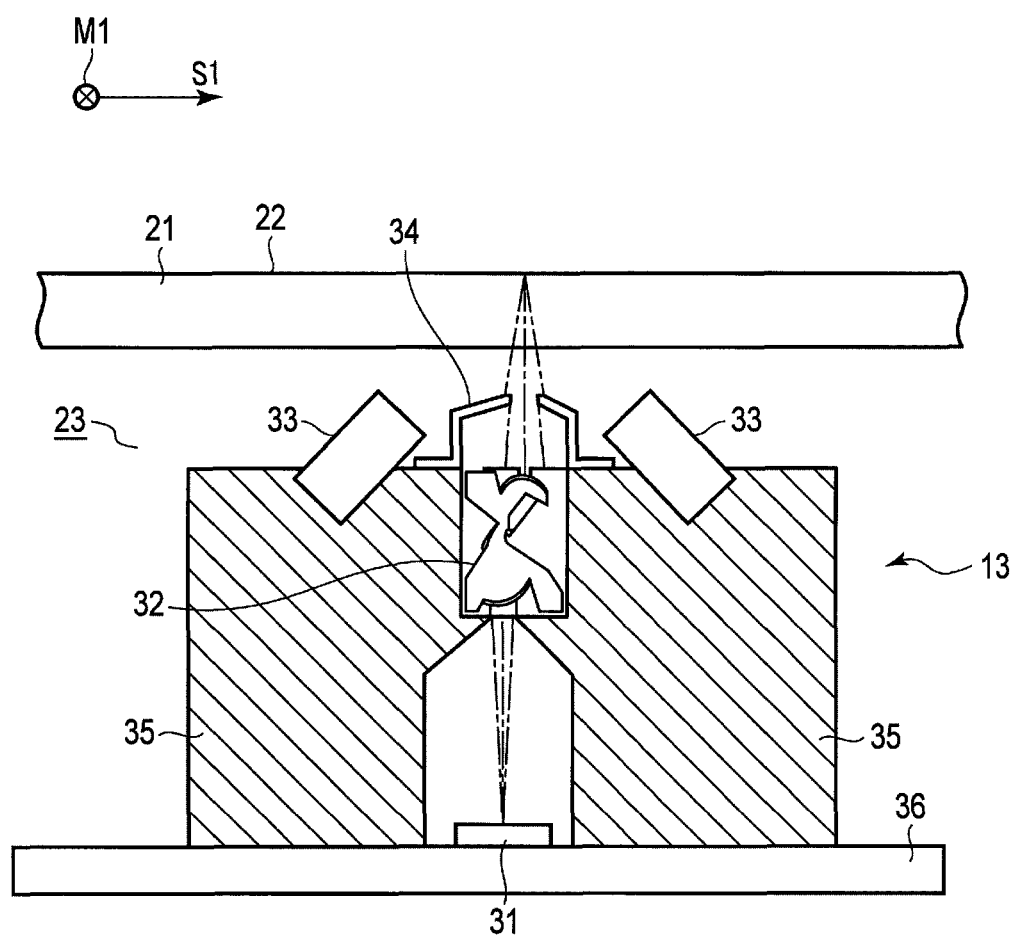
FIG. 2 is a diagram for explaining a configuration example of a part of the image forming apparatus according to the first embodiment.

The scanner unit 13 obtains an image from the paper sheet P. The scanner unit 13 is disposed in the space 23 opposite to the placement surface 22 of the document platen 12. FIG. 2 is a diagram for explaining a configuration example of the scanner unit 13. The scanner unit 13 includes an image sensor 31, a lens mirror array 32, an illumination 33, a light blocking body 34, a casing 35, and a substrate 36.

The image sensor 31 is an imaging element in which pixels for converting light into an electric signal (image signal) are arranged in a line shape. An arrangement direction of the pixels of the image sensor 31 is referred to as a main scan direction M1. For example, the image sensor 31 is configured by a CCD (charged coupled device), a CMOS (complementary metal oxide semiconductor), or other imaging elements.

The lens mirror array 32 is an optical component for forming an image by light from a predetermined reading range on the pixel of the image sensor 31. The reading range of the lens mirror array 32 is a rectangular region on the placement surface 22 of the document platen 12. The lens mirror array 32 forms an image by light, on the pixel of the image sensor 31, reflected by the paper sheet P placed on the placement surface 22 of the document platen 12 and transmitted through the glass plate 21. A detailed configuration of the lens mirror array 32 will be described below.

The illumination 33 irradiates the paper sheet P with light. The illumination 33 includes a light source and a light guide body that irradiates the paper sheet P with the light from the light source. The illumination 33 irradiates a region including the reading range of the lens mirror array 32 by the light guide body with the light emitted from the light source.

The light blocking body 34 is a member for blocking the light. For example, the light blocking body 34 is a member applied with a light blocking material on a surface thereof. The light blocking body 34 is configured in a shape and at a position which prevent light from a region other than the reading range of the lens mirror array 32 from entering the lens mirror array 32.

The casing 35 is a member that supports and positions the image sensor 31, the lens mirror array 32, the illumination 33, the light blocking body 34, and the substrate 36. In addition, the casing 35 includes a light blocking unit that blocks a part of light emitted from the lens mirror array 32. The light blocking unit blocks light that becomes stray light when light is incident on the image sensor 31, or light emitted from the lens mirror array 32 in a direction not incident on the image sensor 31.

The substrate 36 is a component on which the image sensor 31, a signal processing unit that obtains an image by reading of the image signal from the image sensor 31 and performing signal processing with respect to the image signal, a memory that temporarily stores an image, and the like, are mounted.

When the paper sheet P is placed on the placement surface 22 of the document platen 12, the scanner unit 13 is driven by a drive mechanism (not shown) in a sub-scan direction S1 that is a direction orthogonal to the main scan direction M1 and in parallel with the placement surface 22. The scanner unit 13 obtains the entire image of the paper sheet P disposed on the placement surface 22 of the document platen 12 by being driven in the sub-scan direction S1 and continuously obtaining an image line by line by the image sensor 31.

In addition, when the paper sheet P is transported by the ADF 14, the scanner unit 13 is driven at a position facing a position to which the paper sheet P comes into closely contact with the ADF 14. The scanner unit 13 continuously obtains an image line by line by the image sensor 31 from the paper sheet P transported by the ADF 14, and thereby the entire image of the paper sheet P transported by the ADF 14 is obtained.

The paper feed cassette 15 is a cassette that accommodates the paper sheet P therein. The paper feed cassette 15 is configured to be able to supply the paper sheet P from an outside of the casing 11. For example, the paper feed cassette 15 is configured to be able to withdraw from the casing 11.

The paper discharge tray 16 is a tray that supports the paper sheet P discharged from the image forming apparatus 1. For example, the paper discharge tray 16 is provided on an upper surface of the casing 11.

The image forming unit 17 forms an image on the paper sheet P under the control of the main control unit 19. For example, the image forming unit 17 charges the drum, forms the latent image according to the image data (print data) for printing on the charged drum, attaches toner to the latent image formed on the drum, and forms an image on the paper sheet P by transferring the toner attached to the latent image on the paper sheet P.

Figure 3:
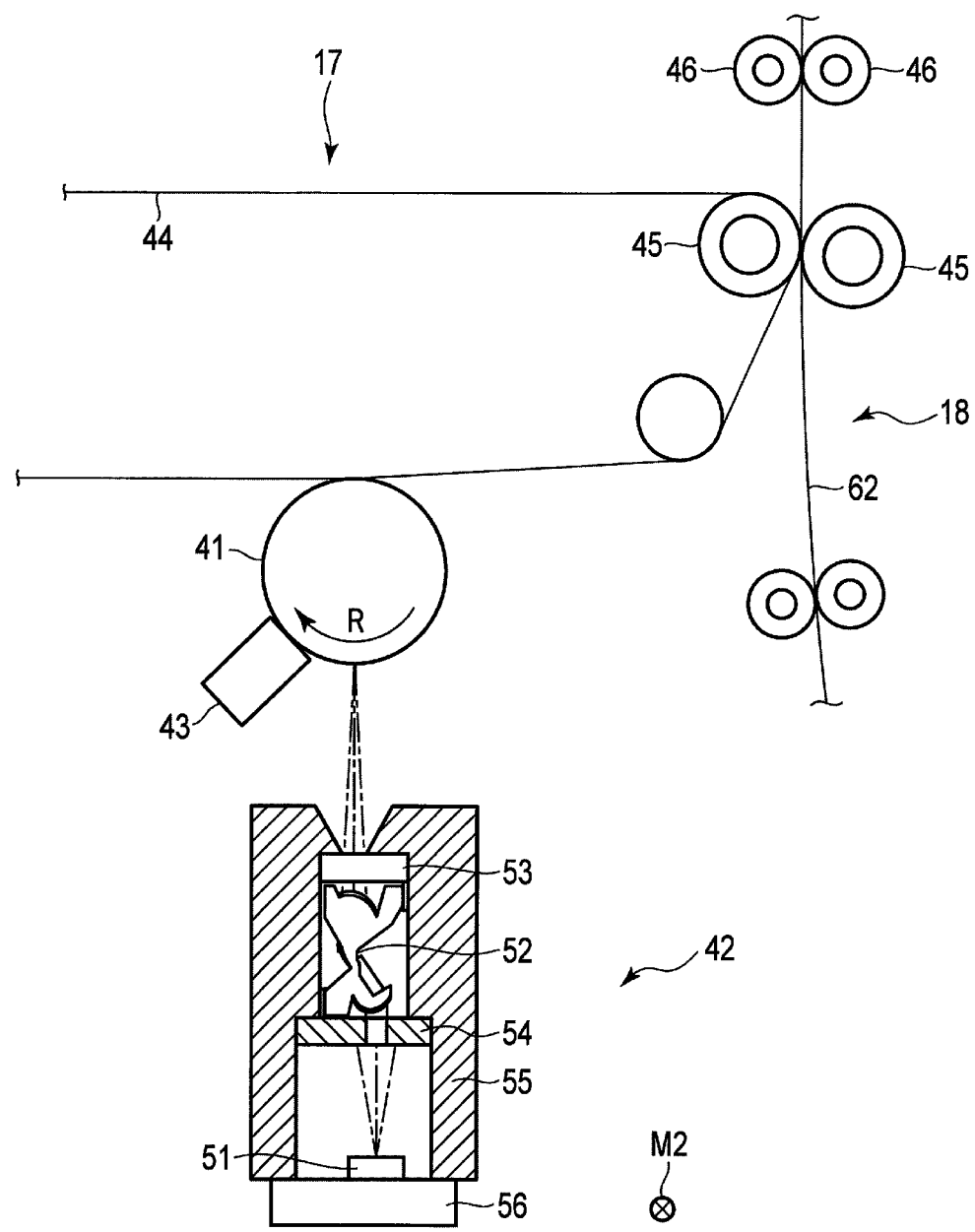
FIG. 3 is a diagram for explaining a configuration example of a part of the image forming apparatus according to the first embodiment.

FIG. 3 is a diagram for explaining a configuration example of the image forming unit 17. For example, as shown in FIG. 3, the image forming unit 17 includes a drum 41, an exposure device 42, a developing device 43, a transfer belt 44, one pair of transfer rollers 45, and one pair of fixing rollers 46.

The drum 41 is a photoconductive drum formed in a cylindrical shape. The drum 41 is provided to be in contact with the transfer belt 44. A surface of the drum 41 is uniformly charged by a charging charger (not shown). In addition, the drum 41 rotates at a constant speed by a drive mechanism (not shown) in a rotation direction R.

The exposure device 42 forms the electrostatic latent image on the charged drum 41. The exposure device 42 irradiates a surface of the drum 41 with light by a light emitting element or the like according to the print data and thereby forms the electrostatic latent image on the surface of the drum 41. As shown in FIG. 3, the exposure device 42 includes a light emitting unit 51, a lens mirror array 52, a protective glass 53, a light blocking body 54, a casing 55, and a substrate 56.

The light emitting unit 51 has a configuration in which the light emitting elements emitting light according to an electric signal (image signal) are arranged in a line shape. An arrangement direction of the light emitting elements in the light emitting unit 51 is referred to as a main scan direction M2. The main scan direction M2 is a direction orthogonal to a light axis of a plurality of light emitting elements and in parallel with a rotation axis of the drum 41. The main scan direction M2 may be the same as the main scan direction M1 of the scanner unit 13, or may be a different direction from the main scan direction M1. The light emitting element of the light emitting unit 51 emits light of a wavelength capable of forming the latent image on the charged drum 41. For example, the light emitting element is an LED or an OLED which emits divergent light which turns on and off each LED according to the image signal.

The lens mirror array 52 is an optical component which forms an image by light emitted from the light emitting element of the light emitting unit 51 on a surface of the drum 41. The lens mirror array 52 has the same configuration as the lens mirror array 32 provided in the scanner unit 13. A range in which an image is formed by light from the lens mirror array 52 is a rectangular region on a surface of the drum 41. That is, the lens mirror array 52 forms an image according to light from the plurality of light emitting elements in the light emitting unit 51 within the rectangular region on the surface of the drum 41. A detailed configuration of the lens mirror array 52 will be described below.

The protective glass 53 is provided between the lens mirror array 52 and the drum 41. The protective glass 53 is a glass for protecting the lens mirror array 52. The protective glass 53 prevents the toner and dust from adhering to the lens mirror array 52.

The light blocking body 54 is provided between the lens mirror array 52 and the light emitting unit 51. The light blocking body 54 is a member for blocking light. For example, the light blocking body 54 is a member applied with a light blocking material on a surface thereof. The light blocking body 54 blocks a part of light emitted from the light emitting unit 51. For example, the light blocking body 54 blocks light passing through a position which is separated by a predetermined distance or more from a light axis of the light emitting element of the light emitting unit 51 in a direction orthogonal to the light axis of the light emitting element.

The casing 55 is a member that supports and positions the light emitting unit 51, the lens mirror array 52, the protective glass 53, the light blocking body 54, and the substrate 56. In addition, the casing 55 includes the light blocking unit that blocks a part of the light emitted from the lens mirror array 52. The light blocking unit blocks light to be the stray light when incident on the drum 41, or light emitted in a direction not incident on a predetermined image formation range on the drum 41 from the lens mirror array 52.

The substrate 56 is apart on which the light emitting unit 51 and a driver or the like for driving the light emitting unit 51 are mounted.

The exposure device 42 inputs the print data to a driver provided in the substrate 56 and thereby the driver emits light from the light emitting unit 51. The light emitted from the light emitting unit 51 forms an image on the drum 41 by the lens mirror array 52. The exposure device 42 continuously forms an image by the light from the light emitting unit 51 with respect to the drum 41 that is rotated, and thereby forms the latent image on the drum 41.

The developing device 43 attaches the toner (developer) to the electrostatic latent image formed on the drum 41. With this, the developing device 43 forms an image (toner image) of the toner on a surface of the drum 41.

The drum 41, the exposure device 42, and the developing device 43 of the image forming unit 17 are provided for different colors such as cyan, magenta, yellow, and black. In this case, a plurality of developing devices 43 hold toners of different colors, respectively.

The transfer belt 44 is a member for receiving the toner image formed on a surface of the drum 41, and transferring the toner image on the paper sheet P. The transfer belt 44 is moved by rotation of a roller. The transfer belt 44 receives the toner image formed on the drum 41, and carries the received toner image to the one pair of transfer rollers 45, at a position in contact with the drum 41.

The one pair of transfer rollers 45 is configured to nip the transfer belt 44 and the paper sheet P. The one pair of transfer rollers 45 transfers the toner image on the transfer belt 44 to the paper sheet P.

The one pair of fixing rollers 46 is configured to nip the paper sheet P therebetween. The one pair of fixing rollers 46 is heated by a heater (not shown). The one pair of fixing rollers 46 applies pressure to the nipped paper sheet Pin a heated state and thereby fixes the toner image formed on the paper sheet P. That is, the one pair of fixing rollers 46 fixes the toner image and thereby an image is formed on the paper sheet P.

The transporting unit 18 transports the paper sheet P. The transporting unit 18 includes a transport path configured by a plurality of guides and a plurality of rollers, and a sensor that detects a transport position of the paper sheet P in the transport path. The transport path is a path through which the paper sheet P is transported. A transport roller is rotated by a motor operated under the control of a transport control unit (not shown) receiving a command of the main control unit 19 and thereby transports the paper sheet P along the transport path. In addition, a part of the plurality of guides is rotated by the motor operated under the control of the transport control unit and thereby switches the transport path that transports the paper sheet P.

For example, as shown in FIG. 1, the transporting unit 18 includes a take-in roller 61, a paper feed transport path 62, a paper discharge transport path 63, and an inversion transport path 64.

The take-in roller 61 feeds the paper sheet P accommodated in the paper feed cassette 15 to the paper feed transport path 62.

The paper feed transport path 62 is a transport path for transporting the paper sheet P fed from the paper feed cassette 15 by the take-in roller 61 to the image forming unit 17.

The paper discharge transport path 63 is a transport path for discharging the paper sheet P on which an image is formed by the image forming unit 17 from the casing 11. The paper sheet P discharged by the paper discharge transport path 63 is discharged to the paper discharge tray 16.

The inversion transport path 64 is a transport path for supplying the paper sheet P to the image forming unit 17 again, in a state where a front surface and a back surface, a leading edge and a trailing edge, and the like of the paper sheet P, are inverted, on which an image is formed by the image forming unit 17.

The main control unit 19 controls the entirety of the image forming apparatus 1. The main control unit 19 includes a processor of a CPU or the like, and a memory. A processor executes a program stored in the memory and thereby the main control unit 19 realizes various process functions. The main control unit 19 controls the scanner unit 13 and thereby obtains an image from the paper sheet P. In addition, the main control unit 19 controls the image forming unit 17 and thereby controls formation of an image with respect to the paper sheet P. For example, the main control unit 19 inputs the print data to the image forming unit 17. The main control unit 19 controls the transport control unit and thereby controls transport of the paper sheet P.

Next, the lens mirror array 32 and the lens mirror array 52 will be described.

FIG. 4 to FIG. 7 are diagrams for explaining configuration examples of the lens mirror array 32 and the lens mirror array 52. Since the lens mirror array 32 and the lens mirror array 52 have the same configuration, an example of the lens mirror array 52 used in the exposure device 42 will be described, in this example.

Figure 4:
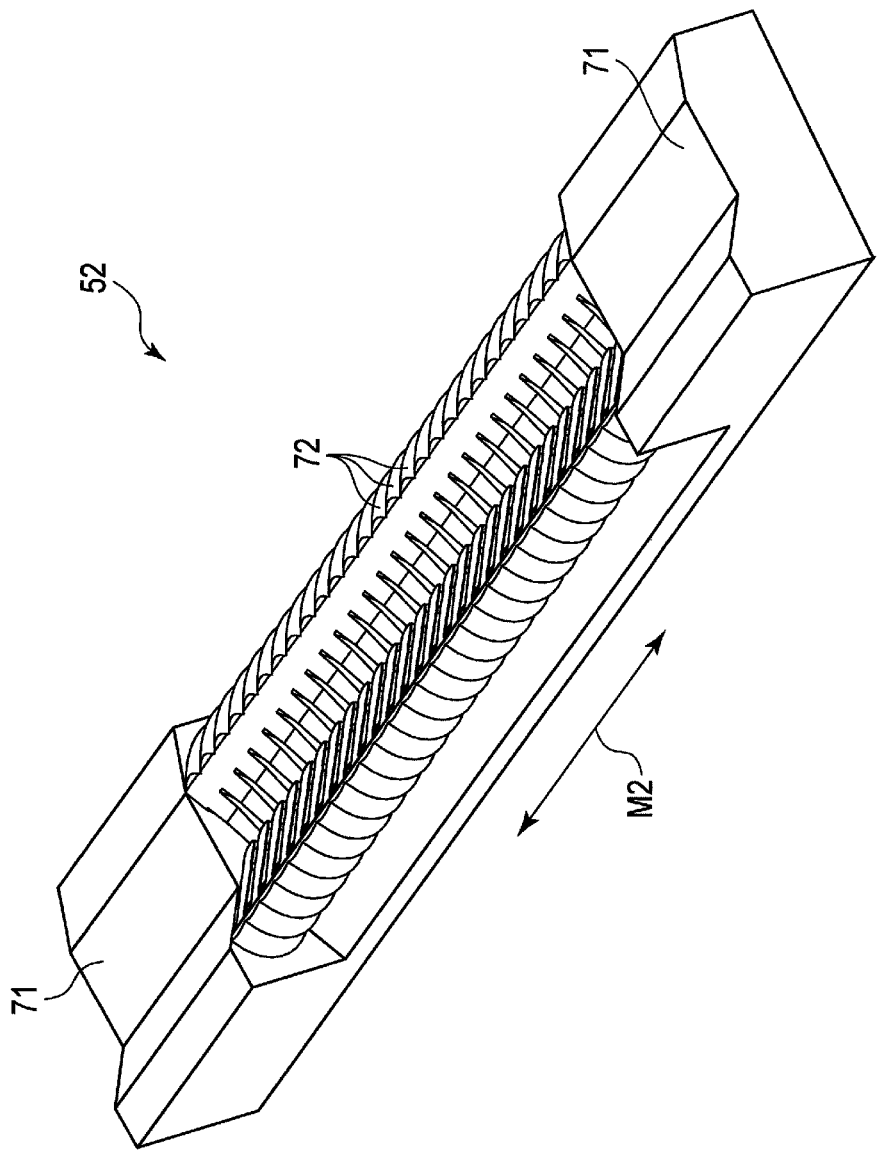
FIG. 4 is a diagram for explaining a configuration example of a lens mirror array according to the first embodiment

FIG. 4 is a perspective view of the lens mirror array 52. The lens mirror array 52 includes a flange unit 71 used for mounting the lens mirror array 52 and a plurality of optical elements 72 arranged along the main scan direction M2. The lens mirror array 52 is formed by injection molding using a mold in which Ni plating is performed on a blank of a mold steel and an Ni layer thereof is manufactured with a tool with R on a corner of the tool. For example, the mold has a inserts. With the mold having the inserts, a plurality of optical elements 72 and the flange unit 71 in the lens mirror array 52 are integrally formed. For example, the lens mirror array 52 is configured by a transparent resin or glass.

The flange units 71 are members which are provided at both ends of the lens mirror array 52 in the arrangement direction of the optical elements 72. Since the flange unit 71 does not affect the optical performance of the lens mirror array 52, the flange unit 71 can be touched with hands when attaching to the exposure device 42 or the like.

The optical element 72 has a function of forming an image by incident light on an image formation target. For example, the optical element 72 forms an image by light from the plurality of light emitting elements of the light emitting unit 51 in an image formation range.

Figure 5:
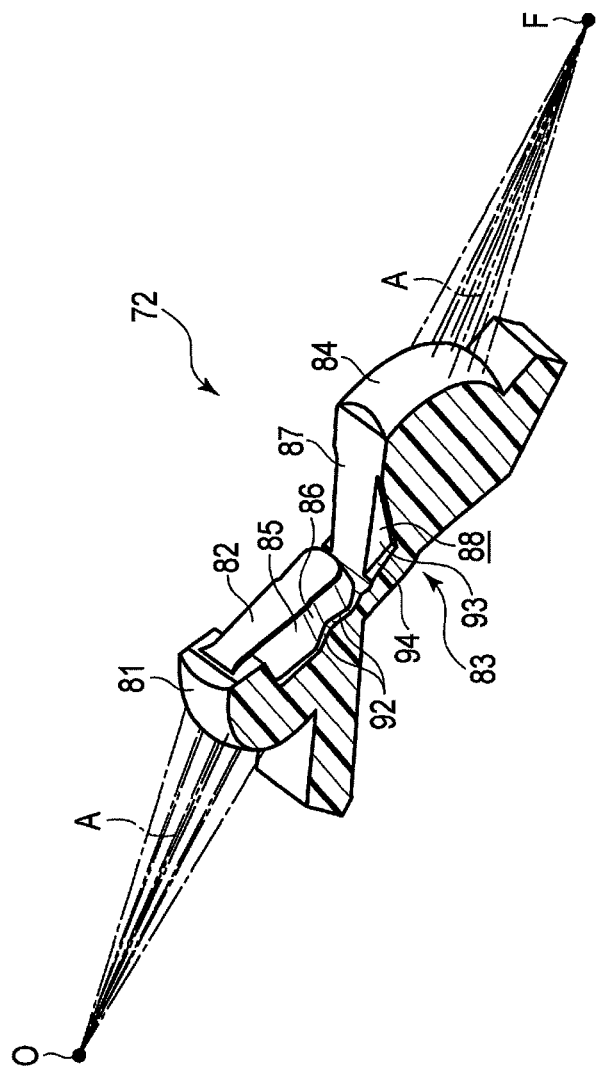
FIG. 5 is a diagram for explaining a configuration example of a part of the lens mirror array according to the first embodiment.
Figure 6:
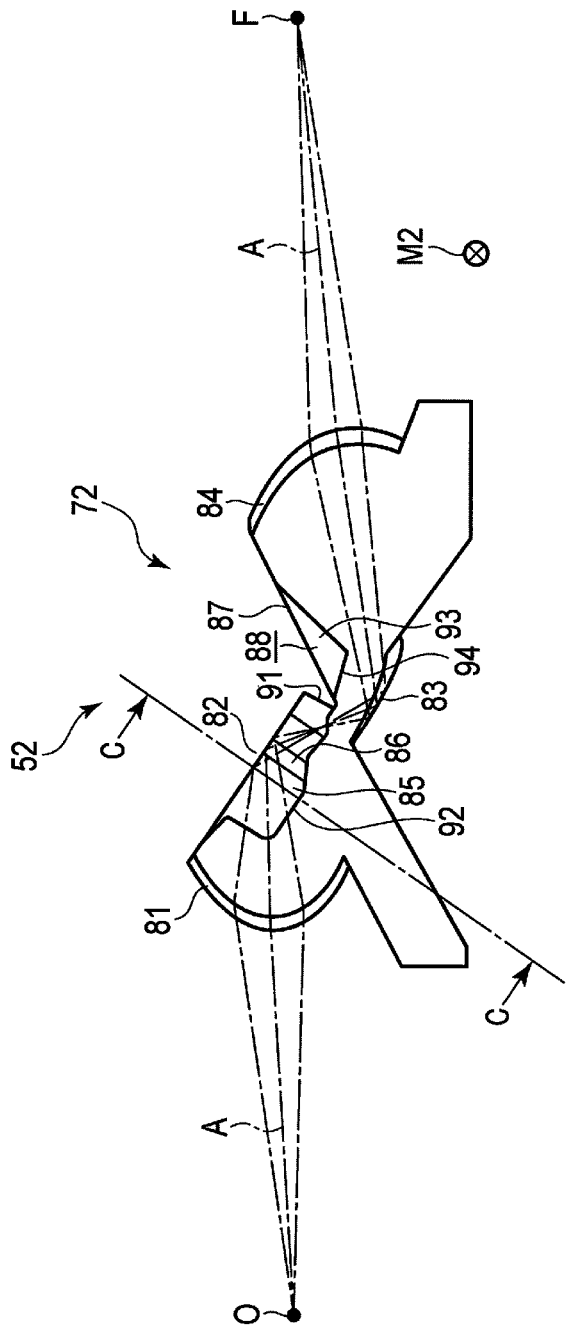
FIG. 6 is a diagram for explaining a configuration example of a part of the lens mirror array according to the first embodiment.
Figure 7:
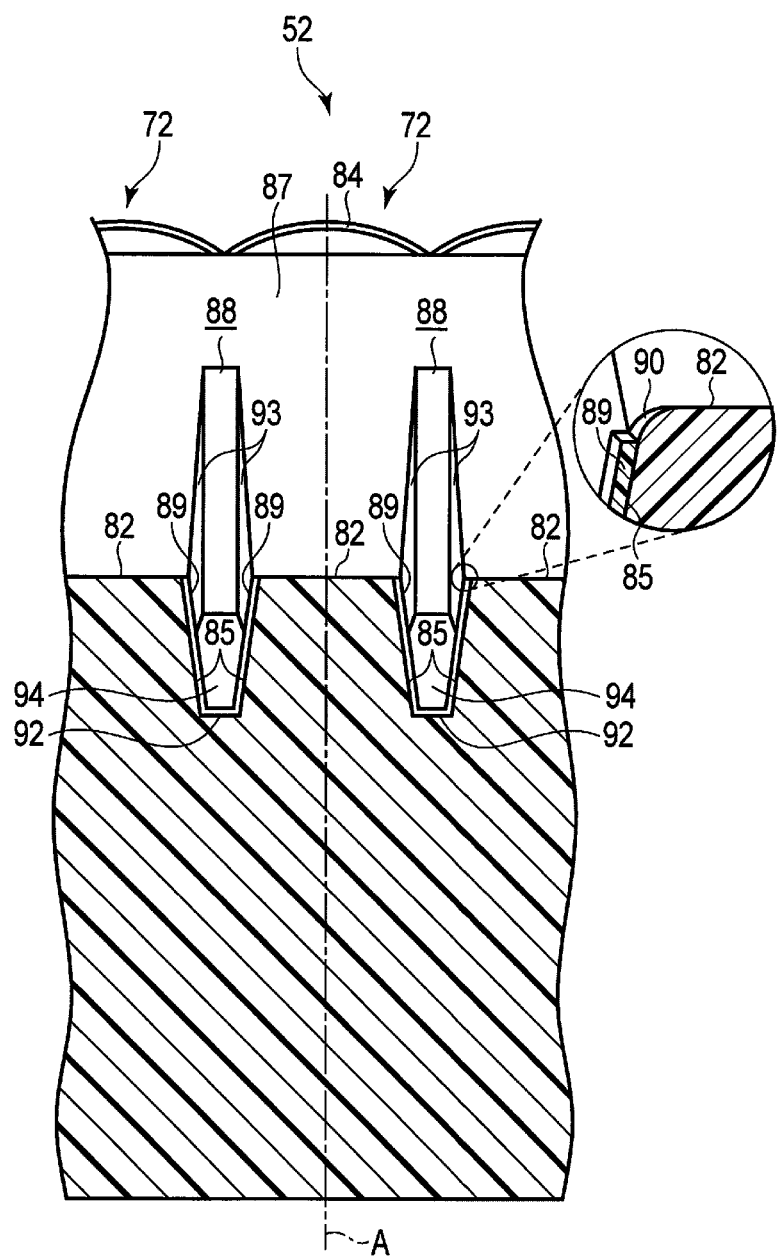
FIG. 7 is a diagram for explaining a configuration example of a part of the lens mirror array according to the first embodiment.

FIG. 5 is a diagram showing one optical element 72 cut from the lens mirror array 52. In addition, FIG. 6 is a diagram for explaining light when one optical element 72 is viewed in the main scan direction M2. FIG. 7 is a diagram for explaining an example of the cross-section C-C of the lens mirror array 52 in FIG. 6.

The optical element 72 includes a first lens surface 81, a first mirror surface 82 that reflects light incident on the first lens surface 81, a second mirror surface 83 that reflects the light reflected by the first mirror surface 82, and a second lens surface 84 that emits the light reflected by the second mirror surface 83. The first lens surface 81, the first mirror surface 82, the second mirror surface 83, and the second lens surface 84 are configured to be surface symmetry with respect to a symmetrical surface A which is a surface orthogonal to the arrangement direction of the optical elements 72.

The optical element 72 forms an image by light from an object point O at an image formation point F. When the optical element 72 is formed on the lens mirror array 52, the light emitting element of the light emitting unit 51 is positioned at the object point O, and a surface of the drum 41 is positioned at the image formation point F. In addition, when the optical element 72 is formed on the lens mirror array 32, a rectangular read region on the placement surface 22 of the document platen 12 is positioned at the object point O, and a pixel of the image sensor 31 is positioned at the image formation point F. In addition, when the optical element 72 is formed on the lens mirror array 32, the main scan direction M2 can be read as the main scan direction M1.

The first lens surface 81 is a convex lens surface whose surface protrudes outward. The first lens surface 81 forms an intermediate inverted image of incident light. Light from a predetermined object point O is incident on the first lens surface 81. For example, the first lens surface 81 is configured such that the light emitted from the plurality of light emitting elements of the light emitting unit 51 is incident thereon. Specifically, the first lens surface 81 is configured such that light emitted from the light emitting elements arranged within a width of two to three times in a pitch of the optical element 72 is incident thereon.

For example, the first lens surface 81 is symmetrical with respect to the symmetrical surface A, and configured as a free curved surface shape. The first lens surface 81 maybe a surface in which curvature of the first lens surface 81 when the first lens surface 81 is cut along a surface (for example, symmetrical surface A) orthogonal to the main scan direction M2 and curvature of the first lens surface 81 when the first lens surface 81 is cut along a surface including a direction between the first lens surface 81 and the second lens surface 84, and the main scan direction M2, are different from each other. Furthermore, the curvature of the first lens surface 81 when the first lens surface 81 is cut along the surface orthogonal to the main scan direction M2 may not be constant if it is symmetrical with respect to the symmetrical surface A. Furthermore, the curvature of the first lens surface 81 when the first lens surface 81 is cut along the surface including the direction between the first lens surface 81 and the second lens surface 84, and the main scan direction M2 may not be constant. Furthermore, the curvature of the first lens surface 81 when the first lens surface 81 is cut along the surface orthogonal to the main scan direction M2 may be symmetrical with respect to the symmetrical surface A, and may be changed by a predetermined change amount. Furthermore, the curvature of the first lens surface 81 when the first lens surface 81 is cut along the surface including the direction between the first lens surface 81 and the second lens surface 84, and the main scan direction M2 may be changed by a predetermined change amount. In addition, the first lens surface 81 may be a spherical surface.

The first mirror surface 82 reflects the light incident on the first lens surface 81. That is, the first mirror surface 82 reflects the light that is incident on the first lens surface and thereby becomes convergent light, and forms the intermediate inverted image after reflection on a downstream side of a light path. The first mirror surface 82 reflects the light incident on the first lens surface 81 by the total reflection or the Fresnel reflection. The first mirror surface 82 is formed in a planar shape on one side of the optical element 72 in a direction orthogonal to the main scan direction M2.

The second mirror surface 83 reflects the light reflected by the first mirror surface 82. That is, the second mirror surface 83 reflects the light that emerges from the intermediate inverted image formed after reflection by the first mirror surface 82. The second mirror surface 83 reflects the reflected light reflected by the first mirror surface 82 by the total reflection or the Fresnel reflection.

For example, the second mirror surface 83 is formed in a rectangular shape, and curved inwardly. For example, the second mirror surface 83 is symmetrical with respect to the symmetrical surface A, and configured as the free curved surface shape. The second mirror surface 83 may be a surface in which curvature of the second mirror surface 83 when the second mirror surface 83 is cut along a surface (for example, symmetrical surface A) orthogonal to the main scan direction M2 and curvature of the second mirror surface 83 when the second mirror surface 83 is cut along the surface including the direction between the first lens surface 81 and the second lens surface 84, and the main scan direction M2, are different from each other. Furthermore, the curvature of the second mirror surface 83 when the second mirror surface 83 is cut along the surface orthogonal to the main scan direction M2 may not be constant if it is symmetrical with respect to the symmetrical surface A. Furthermore, the curvature of the second mirror surface 83 when the second mirror surface 83 is cut along the surface including the direction between the first lens surface 81 and the second lens surface 84, and the main scan direction M2 may not be constant. Furthermore, the curvature of the second mirror surface 83 when the second mirror surface 83 is cut along the surface orthogonal to the main scan direction M2 may be symmetrical with respect to the symmetrical surface A, and may be changed by a predetermined change amount. Furthermore, the curvature of the second mirror surface 83 when the second mirror surface 83 is cut along the surface including the direction between the first lens surface 81 and the second lens surface 84, and the main scan direction M2, may be changed by a predetermined change amount. In addition, the second mirror surface 83 may be a spherical surface. In addition, the second mirror surface 83 may be formed in, for example, a planar shape. The second mirror surface 83 is formed on an opposite side to the first mirror surface 82 of the optical element 72 in the direction orthogonal to the main scan direction M2.

The second lens surface 84 is a convex lens surface whose surface protrudes outward. The second lens surface 84 forms an erect image that is an inverted image of the intermediate inverted image formed by the first lens surface 81 by being combined with the second mirror surface 83. The light emitted from the second lens surface 84 is incident on a predetermined image formation point F. For example, the light emitted from the second lens surface 84 forms an image at a predetermined position within an image formation range on the drum 41.

For example, the second lens surface 84 is symmetrical with respect to the symmetrical surface A, and configured as the free curved surface shape. The second lens surface 84 may be a surface in which curvature of the second lens surface 84 when the second lens surface 84 is cut along the surface (for example, symmetrical surface A) orthogonal to the main scan direction M2 and curvature of the second lens surface 84 when the second lens surface 84 is cut along the surface including the direction between the first lens surface 81 and the second lens surface 84, and the main scan direction M2, are different from each other. Furthermore, the curvature of the second lens surface 84 when the second lens surface 84 is cut along the surface orthogonal to the main scan direction M2 may not be constant if it is symmetrical with respect to the symmetrical surface A. Furthermore, the curvature of the second lens surface 84 when the second lens surface 84 is cut along the surface including the direction between the first lens surface 81 and the second lens surface 84, and the main scan direction M2 may not be constant. Furthermore, the curvature of the second lens surface 84 when the second lens surface 84 is cut along the surface orthogonal to the main scan direction M2 may be symmetrical with respect to the symmetrical surface A, and may be changed by a predetermined change amount. Furthermore, the curvature of the second lens surface 84 when the second lens surface 84 is cut along the surface including the direction between the first lens surface 81 and the second lens surface 84, and the main scan direction M2 may be changed by a predetermined change amount. In addition, the second lens surface 84 may be the spherical surface.

In addition, the optical element 72 includes one pair of first light blocking surfaces 85, a fifth light blocking surface 86, a second light blocking surface 87, and a concave portion 88 formed in the second light blocking surface 87.

The one pair of first light blocking surfaces 85 are provided at positions nipping the symmetrical surface A in the main scan direction M2. That is, the one pair of first light blocking surfaces 85 are disposed along the main scan direction M2 at positions separated from the symmetrical surface A by a predetermined distance. The first light blocking surfaces 85 share sides thereof with the first mirror surface 82. The first light blocking surface 85 forms an obtuse angle with the first mirror surface 82, and forms an acute angle toward an incident side of the symmetrical surface A.

In addition, as shown in FIG. 7, the first light blocking surface 85 includes a light blocking layer 89 that is formed by applying ink (for example, UV ink containing light blocking material such as carbon black or black pigment) having a high light blocking property, with approximately the same refractive index as the lens mirror array, and blocks light. The first light blocking surface 85 includes the light blocking layer 89, and thereby light is prevented from being reflected from the first light blocking surface 85 to an inside of the optical element 72 and emitted outward.

In addition, the above-described first light blocking surface 85 is formed in each of the optical elements 72, and thereby a groove whose both sides are configured as the first light blocking surface 85 between two optical elements 72, is formed. The light blocking layer 89 is also formed on a bottom 92 of the groove. With this, light is prevented from being reflected from the bottom 92 of the groove to the inside of the optical element 72 and emitted outward.

FIG. 7 is a diagram viewing the cross-section C-C of the lens mirror array 52 taken line VII-VII of FIG. 6 in a direction in parallel with the first mirror surface 82 and orthogonal to the main scan direction M2. As described above, since the lens mirror array 52 is formed by the injection molding, a curved surface is formed on a boundary portion. For example, as shown in FIG. 7, a curved surface 90 is formed on the boundary portion between the first mirror surface 82 and the first light blocking surface 85.

When the UV ink before curing covers the entirety of the curved surface 90 and an amount of the ink reaching the first mirror surface 82 is applied, there is a possibility that the UV ink spreads on the first mirror surface 82. For this reason, the UV ink is applied by an amount which does not cover the entirety of the curved surface 90. That is, the light blocking layer 89 is formed in a range which covers at least the entirety of the first light blocking surface 85 and does not reach the entirety of the curved surface 90 so as to prevent the UV ink from adhering to the first mirror surface 82. In addition, as shown in FIG. 7, since the first light blocking surface 85 and the first mirror surface 82 are formed to be an obtuse angle, it is possible to easily peel the lens mirror array 52 from the mold.

The optical elements 72 may continuously be implemented on an end side approaching an emission side of the first mirror surface 82, and may further include a fourth light blocking surface 91 forming an obtuse angle with the first mirror surface 82. The light blocking layer 89 is also formed by applying the UV ink on the fourth light blocking surface 91 similar to the first light blocking surface 85. By providing the light blocking layer 89, the fourth light blocking surface 91 blocks light that is reflected by the first mirror surface 82 and progresses at a position separated from the symmetrical surface A by a predetermined distance, and light that is reflected by the first mirror surface 82 and directly progresses to the second lens surface 84.

The fifth light blocking surface 86 is a surface inclined to a symmetrical surface A side with respect to the first light blocking surface. For example, the fifth light blocking surface 86 is configured as apart of the concave portion that is recessed in a direction orthogonal to the first light blocking surface 85 from the first light blocking surface 85. That is, the fifth light blocking surface 86 is configured as a mountain shape surface together with the first light blocking surface 85.

The fifth light blocking surface 86 may be formed as a flat surface or a curved surface. For example, the fifth light blocking surface 86 is configured as a curved surface having a curvature in one direction. That is, the center of the curvature of the fifth light blocking surface 86 is formed so as to be an arc of a predetermined curvature positioned inside the optical element 72 with respect to the first light blocking surface 85, when cutting along a surface in parallel with the first mirror surface 82. That is, the fifth light blocking surface 86 is configured as a shape corresponding to a part of a cylindrical shape. In addition, the center of the curvature of the fifth light blocking surface 86 may be formed so as to be an arc that is positioned inside the optical element 72 with respect to the first light blocking surface 85, and has a large curvature as approaching a first mirror surface 82 side, when cutting along the surface in parallel with the first mirror surface 82. That is, the fifth light blocking surface 86 may be formed as a shape corresponding to a part of a truncated cone shape.

The light blocking layer 89 is also formed by applying the UV ink on the fifth light blocking surface 86 similar to the first light blocking surface 85. By providing the light blocking layer 89, the fifth light blocking surface 86 blocks light progresses at a position separated from the symmetrical surface A by a predetermined distance.

For example, a portion between the fifth light blocking surface 86 and the fourth light blocking surface 91 is configured as a surface forming an obtuse angle with respect to the first mirror surface 82, and in parallel with the first light blocking surface 85. In addition, the light blocking layer 89 may also be provided on the surface. In addition, if the surface forms an obtuse angle with the first mirror surface 82, and forms an acute angle toward an incident side with respect to the symmetrical surface A, any surface may be used.

The second light blocking surface 87 is formed on a side approaching the second lens surface 84 with respect to the first mirror surface 82, on the same side as a side on which the first mirror surface 82 of the optical element 72 is provided in the direction orthogonal to the main scan direction M2. For example, the second light blocking surface 87 is formed in a planar shape. For example, the second light blocking surface 87 is formed across the second lens surface 84 from a side opposite to the first mirror surface 82 of the fourth light blocking surface 91. That is, the second light blocking surface 87 is configured to share a side thereof with the fourth light blocking surface 91. In addition, the second light blocking surface 87 is formed such that a surface is continuous from the bottom 92 of the groove formed between two optical elements 72. In addition, the second light blocking surface 87 forms an acute angle toward the second mirror surface 83 with respect to the symmetrical surface A between the second mirror surface 83 and the second lens surface 84.

In addition, the light blocking layer 89 is also formed by applying the UV ink on the second light blocking surface 87. Since the light blocking layer 89 is provided on the second light blocking surface 87, it is possible to emit light into the air without reflecting on the first mirror surface 82, and prevent the light incident on the second light blocking surface 87 from entering a structure configuring the optical element 72 again.

The concave portion 88 is a portion formed by being recessed in a direction orthogonal to the second light blocking surface 87 from the second light blocking surface 87. That is, the concave portion 88 is provided on an emission side of the first mirror surface 82 in a direction between the first lens surface 81 and the second lens surface 84.

The concave portion 88 is formed between the two optical elements 72 in the main scan direction M2. That is, the concave portion 88 is formed over adjacent two optical elements 72. As described above, the concave portion 88 is formed in each of the optical elements 72 such that the third light blocking surfaces 93 that are one pair of light blocking surfaces facing each other for each the concave portion 88, are formed.

The third light blocking surface 93 is a surface inclined with respect to the main scan direction M2. That is, the third light blocking surface 93 is a surface forming an angle with respect to the main scan direction M2. For example, the third light blocking surface 93 is formed in a planar shape.

In addition, for example, a bottom 94 between two third light blocking surfaces 93 of the concave portion 88 is formed to be continuous on the bottom 92 of the groove formed between the two optical elements 72.

In addition, the light blocking layer 89 is formed by also applying the UV ink on each surface of the concave portion 88. By the third light blocking surface 93 on which the light blocking layer 89 is formed, since a progressing direction of light includes a component in a direction along the main scan direction M2, the concave portion 88 blocks light entering other optical elements 72.

Figure 8:
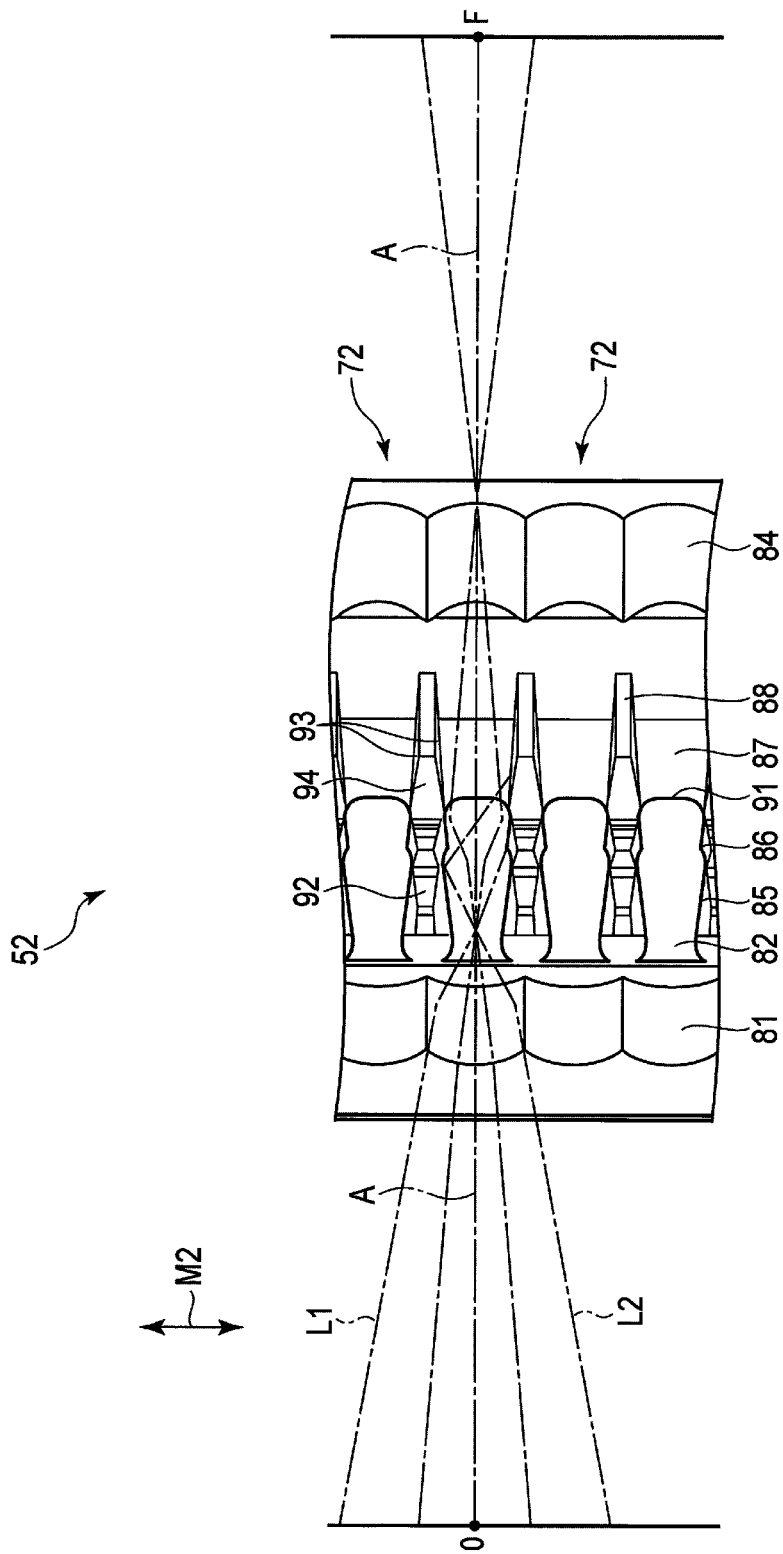
FIG. 8 is a diagram for explaining a configuration example of a part of the lens mirror array according to the first embodiment.

FIG. 8 is a diagram for explaining a light path of light incident on the lens mirror array 52. For example, light incident on the first lens surface 81 from the object point O along the symmetrical surface A of the optical element 72 that is the lens mirror array 52 is reflected in order of the first mirror surface 82 and the second mirror surface 83, and emitted from the second lens surface 84 to the image formation point F of the optical element 72.

In the lens mirror array 52 in which a plurality of optical elements 72 are integrally formed, there is a case where a part of light which enters from the first lens surface 81 and passes through a position separated from the symmetrical surface A by a predetermined distance, is incident on the curved surface 90 formed on the boundary portion between the first mirror surface 82 and the first light blocking surface 85. Since light incident on the curved surface 90 is reflected in a direction corresponding to inclination of a place where the light reaches on the curved surface 90, there is a possibility that the reflected light progresses in various directions and becomes the stray light entering other optical elements 72.

However, the optical element 72 includes the fifth light blocking surface 86 inclined to the symmetrical surface A side with respect to the first light blocking surface 85. With this, as light passing through a light path L1 shown in FIG. 8, the optical element 72 can block a part of light progressing at an angle to be incident on the curved surface 90. As a result, the optical element 72 can decrease the stray light.

In addition, the optical element 72 is provided on an emission side of a first mirror surface 82, and includes the third light blocking surface 93 that forms an angle with respect to the main scan direction M2. With this, as light passing through a light path L2 shown in FIG. 8, the optical element 72 can block a part of light progressing at an angle that is incident on other optical elements 72 by reflecting on the curved surface 90. As a result, the optical element 72 can decrease the stray light.

As described above, the lens mirror array 52 is configured by arranging a plurality of optical elements 72 including the first lens surface 81 on which light is incident, the first mirror surface 82 that reflects light incident on the first lens surface 81, the second mirror surface 83 that reflects the light reflected by the first mirror surface 82, and the second lens surface 84 that emits the light reflected by the second mirror surface 83. Furthermore, the optical element 72 includes the one pair of first light blocking surfaces 85 that are formed to share sides thereof with the first mirror surface 82 at a position nipping the symmetrical surface A defined by the first lens surface 81 and the second lens surface 84 in the arrangement direction of the optical elements 72 of the lens mirror array 52, the fifth light blocking surface 86 inclined on the symmetrical surface A side with respect to the first light blocking surface 85, and the light blocking layer 89 formed over the first light blocking surface 85 and the fifth light blocking surface 86. With the configuration, the lens mirror array 52 can block a part of light incident on the curved surface 90 formed between the first mirror surface 82 and the first light blocking surface 85, and a part of light reflected from the curved surface 90. As a result, the lens mirror array 52 can decrease light to be the stray light by reflecting on the curved surface 90.

In addition, a section surface in a surface in parallel with the first mirror surface 82 of the fifth light blocking surface 86 is formed as an arc of curvature whose center is positioned on the symmetrical surface A side of the first light blocking surface 85. With this, it is possible to increase the inclination with respect to the symmetrical surface A of the fifth light blocking surface 86. With the configuration, the lens mirror array 52 can block more light incident on the curved surface 90. As a result, the lens mirror array 52 can decrease light to be the stray light by reflecting on the curved surface 90.

In addition, the first light blocking surface 85 is configured to form an acute angle toward an emission side of the symmetrical surface A. With this, an interval between the one pair of first light blocking surfaces 85 can be narrower as it approaches the incident side. As a result, it is possible to limit a progress direction of light incident on the curved surface 90. In addition, it is possible to increase a region facing the symmetrical surface A of the fifth light blocking surface 86 continuing to the first light blocking surface 85. As a result, the lens mirror array 52 can decrease light to be the stray light by reflecting on the curved surface 90.

In order to simplify a step of implementing a mold for the injection molding of the lens mirror array 52, it is desirable that a curvature radius of the fifth light blocking surface 86 is configured with a curvature radius of ⅛ or more of the widest interval between the one pair of first light blocking surfaces 85 in the optical element 72. According to the configuration, a tool (for example, front milling cutter or end mill) having a diameter corresponding to the curvature radius of the fifth light blocking surface 86 is reciprocated twice in a direction approximately in parallel with the symmetrical surface A and the first mirror surface 82 such that it is possible to form a structure of a mold for the injection molding of the first light blocking surface 85, the fifth light blocking surface 86, and the fourth light blocking surface 91. That is, since the curvature radius of the fifth light blocking surface 86 is configured with the curvature radius of ⅛ or more of the widest interval between the one pair of first light blocking surfaces 85 in the optical element 72, it is possible to decrease a manufacturing time of the mold. A small curvature radius of the fifth light blocking surface 86 has a large light blocking effect in the stray light compared to a large curvature radius. For this reason, it is desirable that the curvature radius of the fifth light blocking surface 86 is a value, as small as possible, of ⅛ or more of the widest interval between the one pair of first light blocking surfaces 85 in the optical element 72.

It is further desirable that the curvature radius of the fifth light blocking surface 86 is configured with a curvature radius of ¼ or more of the widest interval between the one pair of first light blocking surfaces 85 in the optical element 72. According to the configuration, a tool (for example, front milling cutter or end mill) having a diameter corresponding to the curvature radius of the fifth light blocking surface 86 is reciprocated once in the direction approximately in parallel with the symmetrical surface A and the first mirror surface 82 such that it is possible to form the structure of the mold for the injection molding of the first light blocking surface 85, the fifth light blocking surface 86, and the fourth light blocking surface 91. That is, since the curvature radius of the fifth light blocking surface 86 is configured with the curvature radius of ¼ or more of the widest interval between the one pair of first light blocking surfaces 85 in the optical element 72, it is possible to further decrease a manufacturing time of the mold.

Furthermore, in order to continuously manufacture a surface of the first mirror surface 82, the curvature radius of the fifth light blocking surface 86 needs to be half or less of the width of the narrowest portion of the first mirror surface. When the condition is not satisfied, a tool is moved to avoid a narrow place by separating the tool before or after the narrow place once from the mold, and the manufacturing is performed by lowering the tool to the same height again. In this manner, a step is formed on the first mirror surface 82, and optical performance is deteriorated.

In addition, the optical element 72 includes the second light blocking surface 87 that is on the same side as a side on which the first mirror surface 82 of the optical element 72 is provided in the direction orthogonal to the main scan direction M2, and formed on a side of the first mirror surface 82 close to the second lens surface 84. Furthermore, the lens mirror array 52 includes the concave portion 88 formed by recessing in a direction orthogonal to the second light blocking surface 87 over adjacent two optical elements 72. The lens mirror array 52 includes the third light blocking surfaces 93 that are the one pair of light blocking surfaces facing each other for each the concave portion 88 and inclined with respect to the main scan direction M2, and the light blocking layer 89 formed over the second light blocking surface 87 and the third light blocking surface 93. With the configuration, the lens mirror array 52 can block a part of light progressing at an angle which enters other optical elements 72 by reflecting on the curved surface 90. As a result, the optical element 72 can decrease the stray light.

In addition, the concave portion 88 configuring the third light blocking surface 93 is formed at a position separated from the symmetrical surface A by a predetermined distance in the arrangement direction of the optical elements 72 over adjacent two optical elements 72. For this reason, it is possible that light contributing to the image formation, which is not the stray light, is not blocked by the third light blocking surface 93, or the amount of the light to be blocked is negligible.

In addition, the bottom 92 between the two first light blocking surfaces 85 facing each other of the lens mirror array 52, and the bottom 94 of the concave portion 88 are configured as continuous surfaces. That is, the bottom 94 of the concave portion 88 is configured as a continuous surface with the bottom 92 that is a surface between the two first light blocking surfaces 85 facing each other in the adjacent optical elements 72. By adopting such a configuration, when the UV ink is applied on the light blocking surface 87, the UV ink spreads on the light blocking surface 85 and the bottom 92 without a break. As a result, it is possible to form a light blocking layer without defects while reducing the number of processes for forming the light blocking layer, and it is possible for the optical element 72 to decrease the stray light.

Second Embodiment

In the first embodiment, the optical element 72 is described as a configuration in which one pair of fifth light blocking surfaces 86 is provided between the first lens surface 81 and the fourth light blocking surface 91. However, the embodiment is not limited to the configuration. According to an optical design of the lens mirror array 52, there is a possibility that the stray light occurs by entering of the light in a wide range of the curved surface 90. Since the optical element 72 includes a plurality of pairs of the fifth light blocking surfaces 86 between the first lens surface 81 and the fourth light blocking surface 91, it is possible to block light progressing in a direction entering the wide range of the curved surface 90.

Figure 9:
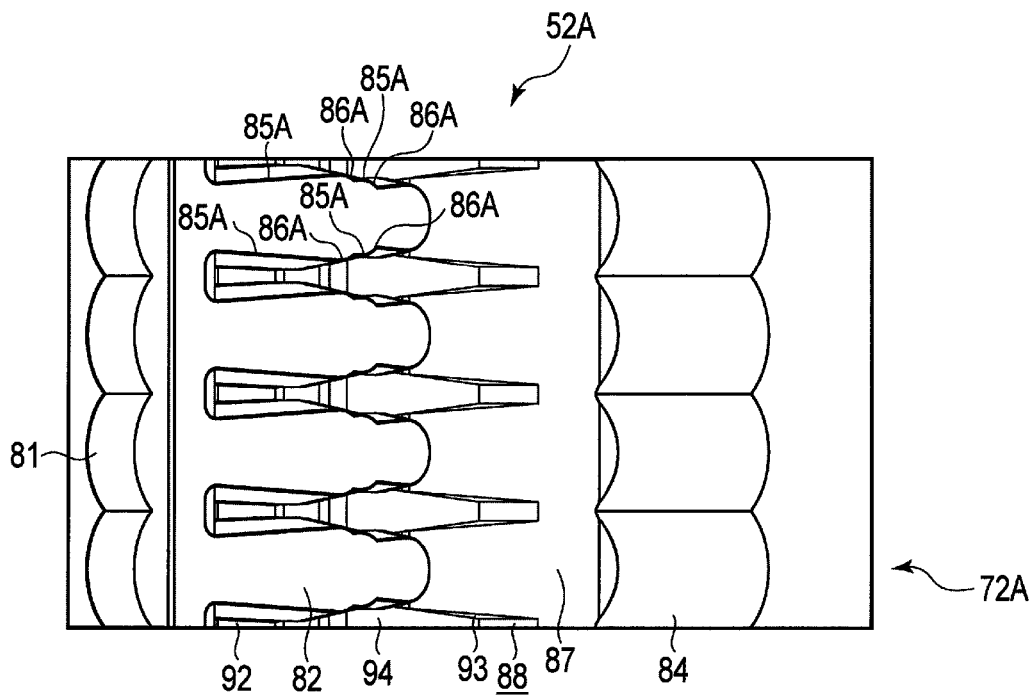
FIG. 9 is a diagram for explaining a configuration example of apart of a lens mirror array according to a second embodiment.
Figure 10:
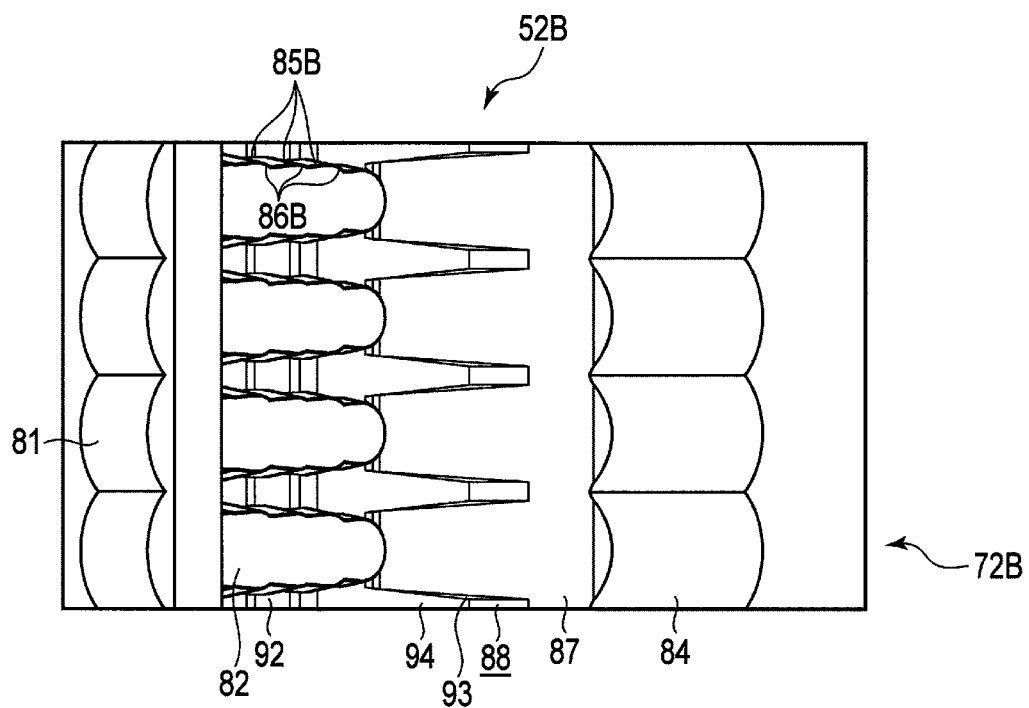
FIG. 10 is a diagram for explaining another configuration example of a part of a lens mirror array according to the second embodiment.

FIG. 9 and FIG. 10 are diagrams showing a configuration example of apart of a lens mirror array on which optical elements including a plurality of pairs of the second light blocking surfaces are arranged. FIG. 9 is a diagram showing a configuration example of a part of a lens mirror array 52A including two pairs of fifth light blocking surfaces 86A. FIG. 10 is a diagram for explaining a configuration example of a part of a lens mirror array 52B including three pairs of fifth light blocking surfaces 86B.

As shown in FIG. 9, the lens mirror array 52A includes a plurality of optical elements 72A arranged in the main scan direction. The optical element 72A includes the first lens surface 81, the first mirror surface 82, the second mirror surface 83, the second lens surface 84, two pairs of first light blocking surfaces 85A, and the two pairs of fifth light blocking surfaces 86A, the second light blocking surface 87, the concave portion 88 formed on the second light blocking surface 87, the fourth light blocking surface 91, and the third light blocking surface 93 that is a surface of the concave portion 88.

The two pairs of first light blocking surfaces 85A are provided at a position nipping the symmetrical surface A in the main scan direction M2 and are surfaces which form an obtuse angle with the first mirror surface 82 and form an acute angle toward the incident side with respect to the symmetrical surface A, similar to the first light blocking surface 85.

The two pairs of fifth light blocking surfaces 86A are surfaces inclined to the symmetrical surface A side with respect to the first light blocking surfaces 85A similar to the fifth light blocking surface 86.

A surface is continuous in the order of the first light blocking surfaces 85A, the fifth light blocking surface 86A, the first light blocking surfaces 85A, and the fifth light blocking surface 86A, toward the fourth light blocking surface 91 from the first lens surface 81. In addition, an interval between the fifth light blocking surfaces 86A forming a pair is formed to be wide as it is close to the incident side.

In addition, as shown in FIG. 10, the lens mirror array 52B includes a plurality of optical elements 72B arranged in the main scan direction. The optical element 72B includes the first lens surface 81, the first mirror surface 82, the second mirror surface 83, the second lens surface 84, three pairs of first light blocking surfaces 85B, the three pairs of fifth light blocking surfaces 86B, the second light blocking surface 87, the concave portion 88 formed on the second light blocking surface 87, the fourth light blocking surface 91, and the third light blocking surface 93 that is a surface of the concave portion 88.

The three pairs of first light blocking surfaces 85B are provided at a position nipping the symmetrical surface A in the main scan direction M2, and are surfaces forming an obtuse angle with the first mirror surface 82, and an acute angle toward the incident side with respect to the symmetrical surface A, similar to the first light blocking surface 85 and the first light blocking surfaces 85A.

The three pairs of fifth light blocking surfaces 86B are surfaces inclined to the symmetrical surface A side with respect to the first light blocking surface 85B, similar to the fifth light blocking surface 86 and the fifth light blocking surface 86A.

A surface is continuous in the order of the first light blocking surface 85B, the fifth light blocking surface 86B, the first light blocking surface 85B, the fifth light blocking surface 86B, the first light blocking surface 85B, and the fifth light blocking surface 86B toward the fourth light blocking surface 91 from the first lens surface 81. In addition, an interval between the fifth light blocking surfaces 86B forming a pair is formed to be wide as it is close to the incident side.

According to the configuration, the lens mirror array 52 can block the light reflected by the curved surface 90 by the fifth light blocking surface 86A or the fifth light blocking surface 86B on the emission side. As a result, the optical element 72 can decrease the stray light.

In the embodiment, the image sensor 31 is configured by arranging the pixels for converting the light into the electric signal (image signal) in a line shape. However, the embodiment is not limited to the configuration. The image sensor 31 may be configured by arranging the pixels for converting the light into the electric signal (image signal) in a plurality of rows in a line shape. In this case, the scanner unit 13 includes a plurality of lens mirror arrays 32 corresponding to respective rows of the pixels of the image sensor 31 in order to form an image by the light from the reading range on the pixels of the respective rows of the image sensors 31. Also, the scanner 31 may include one lens mirror array 32 that forms an image on a region including the pixels of the respective rows of the image sensor 31 in order to form an image by the light from the reading range on the pixels of the respective rows of the image sensor 31. In addition, the image sensor 31 may have a configuration in which pixels having sensitivities of light of different wavelengths are arranged for each row. Furthermore, the image sensor 31 may have a configuration in which pixels having sensitivities of light of wavelengths of red, green, and blue colors are arranged in a zig-zag pattern over two rows.

In addition, the embodiment is described that the light emitting unit 51 is configured by arranging the light emitting elements emitting the light according to the electric signal (image signal) in a line shape. However, the embodiment is not limited to the configuration. The light emitting unit 51 may be configured by arranging the light emitting elements emitting the light according to the electric signal (image signal) in a plurality of rows in a line shape. In this case, the exposure device 42 includes a plurality of lens mirror arrays 52 corresponding to the respective rows of the light emitting elements of the light emitting unit 51 in order to form an image by the light from the respective rows of the light emitting elements on the surface of the drum 41. Also, the exposure device 42 may include one lens mirror array 52 that forms an image by the light from a region including the respective rows of the light emitting elements of the light emitting unit 51 on the surface of the drum 41 in order to form an image by the light from respective rows of the light emitting elements on the surface of the drum 41. In addition, the light emitting unit 51 may have a configuration in which the light emitting elements emitting light of different wavelength for each row are arranged. Furthermore, the light emitting unit 51 may have a configuration in which the light emitting elements emitting light of wavelengths of red, green, and blue colors are arranged in the zig-zag pattern over two rows.

In addition, in the embodiment, as an example of the image forming apparatus using the lens mirror array, a printer forming an image by the toner on the paper sheet, and a scanner forming an image by reading the reflected light from the paper sheet are exemplified. However, the embodiment is not limited to the configuration. If an image is formed by the light from the reading range on an image formation target, the lens mirror array may be used for anything. For example, the lens mirror array may be used in a silver halide print apparatus which forms an image by forming an image by light from a light emitting unit in which OLED light sources emitting a plurality of different colors are arranged in a two-dimensional manner, on a surface of a photoconductive material.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A lens mirror array comprising a plurality of optical elements, each optical element comprising a first lens surface on which light is incident, a first mirror surface that reflects the light incident on the first lens surface, a second mirror surface that reflects the light reflected by the first mirror surface, and a second lens surface that emits the light reflected by the second mirror surface, wherein the first lens surface, the first mirror surface, the second mirror surface, and the second lens surface each formed symmetrically with respect to a symmetrical surface orthogonal to an arrangement direction of the optical elements, the optical elements further comprising:
   at least one pair of first light blocking surfaces adjacent the first mirror surface at positions nipping the symmetrical surface in the arrangement direction of the optical elements;
   a second light blocking surface positioned on a side close to the second lens surface further than the first mirror surface on the same side as the first mirror surface of the optical elements wherein the second light blocking surface is facing to the first light blocking surface with a predetermined angle and is located between the first light blocking surface and the second lens surface;
   a concave portion comprising one pair of third light blocking surfaces recessed from the second light blocking surface in a direction orthogonal to the second light blocking surface over adjacent two optical elements, and inclined with respect to the arrangement direction of the optical elements;
   and a light blocking layer over the first light blocking surface, the second light blocking surface, and the third light blocking surface.

2. The array according to claim 1, wherein the pair of third light blocking surfaces is formed at a position separated from the symmetrical surface used in common by a predetermined distance in the arrangement direction of the optical elements.

3. The array according to claim 1, wherein a bottom of the concave portion is a continuous surface with a surface between the two first light blocking surfaces facing each other in the adjacent optical elements.

4. The array according to claim 1, wherein the second mirror surface has a curved shape or a planar shape.

5. The array according to claim 1, wherein the first light blocking surfaces comprise a cured UV ink comprising carbon black or a black pigment.

6. The array according to claim 1, wherein the second light blocking surfaces comprise a cured UV ink comprising carbon black or a black pigment.

7. An image forming apparatus comprising:
a light emitting unit comprising a plurality of light emitting elements that emit light; and
a lens mirror array comprising a plurality of optical elements, each optical element comprising a first lens surface on which light from the light emitting element is incident;
a first mirror surface that reflects the light incident on the first lens surface, a second mirror surface positioned to reflect the light reflected by the first mirror surface, and a second lens surface that forms an image by the light reflected by the second mirror surface on a surface of an image formation target, and the first lens surface, the first mirror surface, the second mirror surface, and the second lens surface are each formed symmetrically with respect to a symmetrical surface orthogonal to an arrangement direction of the optical elements;
the optical elements further comprising:
at least one pair of first light blocking surfaces sharing sides thereof with the first mirror surface at positions nipping the symmetrical surface in the arrangement direction of the optical elements;
a second light blocking surface on a side close to the second lens surface further than the first mirror surface on the same side as the first mirror surface of the optical elements wherein the second light blocking surface is facing to the first light blocking surface with a predetermined angle and is located between the first light blocking surface and the second lens surface;
a concave portion comprising one pair of third light blocking surfaces recessed from the second light blocking surface in a direction orthogonal to the second light blocking surface over adjacent two optical elements, and inclined with respect to the arrangement direction of the optical elements; and
a light blocking layer over the first light blocking surface, the second light blocking surface, and the third light blocking surface.

8. The apparatus according to claim 7, further comprising:
a drum having a cylindrical shape;
a developing device that forms a toner image by attaching a developer on an electrostatic latent image formed on the drum;
a transfer device that transfers the toner image formed on a surface of the drum onto a paper sheet; and
a fixing roller that forms an image on the paper sheet by fixing the toner image transferred onto the paper sheet, wherein the lens mirror array forms the electrostatic latent image by forming an image by the light from the light emitting element on the surface of the drum.

9. The apparatus according to claim 7, wherein the pair of third light blocking surfaces is formed at a position separated from the symmetrical surface used in common by a predetermined distance in the arrangement direction of the optical elements.

10. The apparatus according to claim 7, wherein a bottom of the concave portion is a continuous surface with a surface between the two first light blocking surfaces facing each other in the adjacent optical elements.

11. The apparatus according to claim 7, wherein the second mirror surface has a curved shape or a planar shape.

12. The apparatus according to claim 7, wherein the first light blocking surfaces comprise a cured UV ink comprising carbon black or a black pigment.

13. The apparatus according to claim 7, wherein the second light blocking surfaces comprise a cured UV ink comprising carbon black or a black pigment.

14. An image forming apparatus comprising:
an illumination that irradiates with light a rectangular reading range in a document platen on which a paper sheet is placed;
an image sensor in which pixels forming an image by converting the light into an electric signal are arranged in a line shape; and
a lens mirror array comprising a plurality of optical elements, an optical element comprising a first lens surface on which light from the reading range is incident, a first mirror surface that reflects the light incident on the first lens surface, a second mirror surface that reflects the light reflected by the first mirror surface, and a second lens surface that forms an image by the light reflected by the second mirror surface on the pixels of the image sensor, and the first lens surface, the first mirror surface, the second mirror surface, and the second lens surface are each formed symmetrically with respect to a symmetrical surface orthogonal to an arrangement direction of the optical elements;
the optical elements further comprise:
at least one pair of first light blocking surfaces adjacent the first mirror surface at positions nipping the symmetrical surface in the arrangement direction of the optical elements;
a second light blocking surface on a side close to the second lens surface further than the first mirror surface on the same side as the first mirror surface of the optical elements wherein the second light blocking surface is facing to the first light blocking surface with a predetermined angle and is located between the first light blocking surface and the second lens surface;
a concave portion comprising one pair of third light blocking surfaces recessed from the second light blocking surface in a direction orthogonal to the second light blocking surface over adjacent two optical elements, and inclined with respect to the arrangement direction of the optical elements; and
a light blocking layer over the first light blocking surface, the second light blocking surface, and the third light blocking surface.

15. The apparatus according to claim 14, wherein the image sensor is a CCD image sensor or a CMOS image sensor.

16. The apparatus according to claim 14, wherein the pair of third light blocking surfaces is formed at a position separated from the symmetrical surface used in common by a predetermined distance in the arrangement direction of the optical elements.

17. The apparatus according to claim 14, wherein a bottom of the concave portion is a continuous surface with a surface between the two first light blocking surfaces facing each other in the adjacent optical elements.

18. The apparatus according to claim 14, wherein the second mirror surface has a curved shape or a planar shape.

19. The apparatus according to claim 14, wherein the first light blocking surfaces comprise a cured UV ink comprising carbon black or a black pigment.

* * * * *